May 7, 1940.  J. MacBLANE  2,199,501
SAFETY DEVICE FOR PUNCH PRESSES
Filed May 24, 1938  2 Sheets-Sheet 1

Witness:
Burr W. Jones

INVENTOR.
James MacBlane
BY Clinton S. Janes
ATTORNEY.

May 7, 1940.     J. MacBLANE     2,199,501
SAFETY DEVICE FOR PUNCH PRESSES
Filed May 24, 1938     2 Sheets-Sheet 2

Witness:
Burr W. Jones

INVENTOR.
BY James MacBlane
Clinton S. Jones
ATTORNEY.

Patented May 7, 1940

2,199,501

UNITED STATES PATENT OFFICE 2,199,501

SAFETY DEVICE FOR PUNCH PRESSES

James MacBlane, Elmira Heights, N. Y., assignor, by mesne assignments, to Bendix Aviation Corporation, South Bend, Ind., a corporation of Delaware Application May 24, 1938, Serial No. 209,751

3 Claims. (Cl. 192—131)

The present invention relates to safety devices for punch presses or the like, and more particularly to a device for rendering a punch press inoperative except when both the hands of the operator are in certain safe positions.

Punch presses and similar types of mechanism in which the work is manually adjusted into operative position, must be provided with some form of safety device to prevent injury to the operator. Such safety devices in general use comprise various mechanical means such as movable guards or grills which interpose themselves between the operator and the work prior to the start of the operative cycle of the press; or cuffs to be attached to the wrists of the operator with retracting means for jerking his hands out of the danger zone when the press is operated.

The gate type of guard is clumsy and expensive and difficult to adjust so as to reliably prevent operation of the press when a finger only of the operator is caught beneath the gate, without interfering with the normal operation of the press. It reduces the visibility and accessibility of the work in the press and greatly impedes the operation of the press.

The cuff type of guard is also clumsy and an impediment to the manipulation of the work. Furthermore, it has the disadvantage that it must be attached to the operator to be effective, and since the device is usually considered burdensome and repugnant to the operator, he is apt to neglect to attach it unless close supervision is maintained.

All the various types of guards now in general use, moreover, are specialized in character and adapted for use on only particular types of machines.

It is an object of the present invention to provide a novel safety device for power presses which is effective and reliable in operation, but simple and economical in construction.

It is another object to provide such a device which is readily applicable to a great variety of commercial forms of presses and the like.

It is a further object to provide such a device which may be of substantially standardized construction irrespective of the size and type of machine to which it may be applied.

It is a further object to provide such a device which provides a minimum of interference with the normal operation of the machine and does not adversely affect the visibility or accessibility of the work therein.

It is another object to provide such a device in which the parts are not subject to appreciable wear nor to liability of loss of adjustment in operation.

It is another object to provide such a device which is effective at all times without requiring attachment or adjustment to the operator.

It is a further object to provide such a device in which failure of the safety device for any reason such as failure of the electrical power at a critical time, merely renders the machine inoperative so that the safety of the operator is not jeopardized under any circumstances.

It is a further object to provide such a device which incorporates a single-stroke mechanism for restricting the operation of the press to one complete cycle for each actuation of the controlling device.

Further objects and advantages will be apparent from the following description taken in connection with the accompanying drawings in which.

Figure 1:
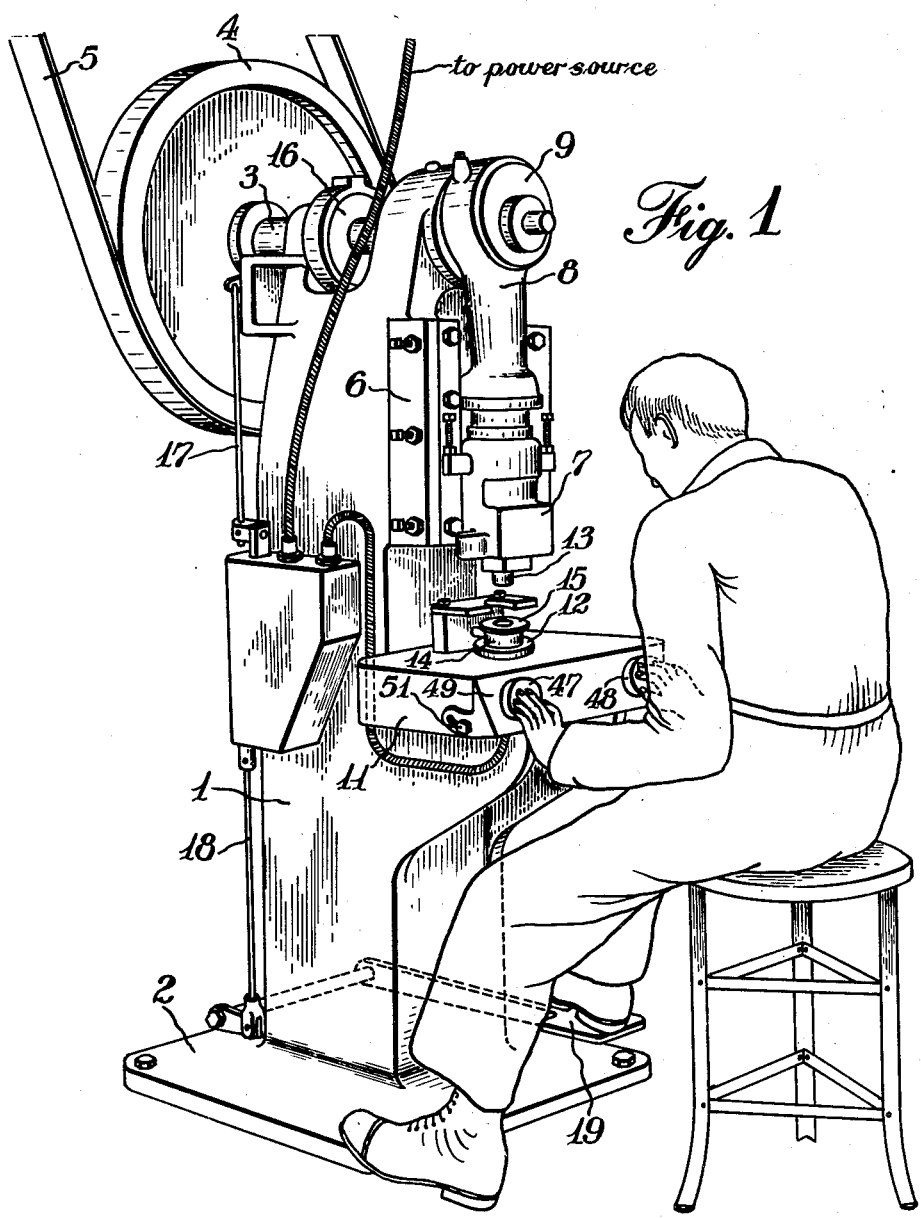
Fig. 1 is a perspective view of a conventional form of power press with a preferred embodiment of the invention applied thereto, and illustrating the actuation thereof by an operator.

In Fig. 1 of the drawings there is illustrated a power press comprising an upright frame 1 mounted on a pedestal 2 and having journalled in its upper end a drive shaft 3 actuated by any suitable means such as a belt pulley 4 and belt 5. Guides 6 are mounted on the front of the frame 1 in which is slidably mounted a ram 7 which is reciprocated by a connecting rod 8 actuated by an eccentric 9 adapted to be rotated by the driving shaft 3. A table 11 is mounted on the side of the frame 1 and carries an anvil and work holder 12 conveniently accessible to the operator and in juxtaposition to the ram 7 so that a punch 13 carried by the ram 7 may operate in conjunction with a die 14 carried by the anvil 12 to form a blank 15 into a desired shape when the ram 7 is operated by the eccentric 9.

Means are provided for actuating the eccentric 9 from the drive shaft 3 comprising a clutch mechanism 16 adapted to be actuated by linkage including draw bars 17 and 18 from a treadle 19 located conveniently to the operator. It will be understood that the clutch mechanism 16 is arranged to connect the eccentric 9 to the driving shaft 3 upon actuation thereof by the draw bar 17, and that the usual means are provided for insuring that the eccentric 9 stops on top dead center after the draw bar 17 is released. Since the clutch 16 and the operating mechanism for the eccentric 9 form no part of the present invention but are conventional in character, further description thereof is deemed unnecessary.

According to the present invention means are provided for causing the eccentric 9 to make only one revolution, and consequently the ram 7 to make one reciprocation when the treadle 19 is depressed, and for preventing operation of the ram 7 except when both the hands of the operator are in certain positions of safety as illustrated in Fig. 1.

Figure 2:
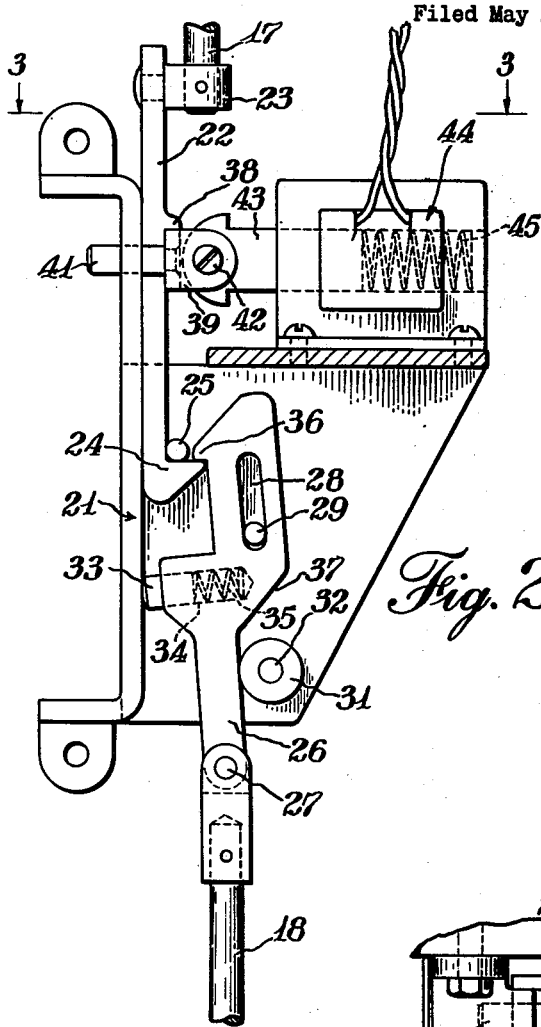
Fig. 2 is an enlarged detail view in elevation, partly in section, of a portion of the operating mechanism of the press with the single-stroke mechanism and guard device applied thereto.
Figure 3:
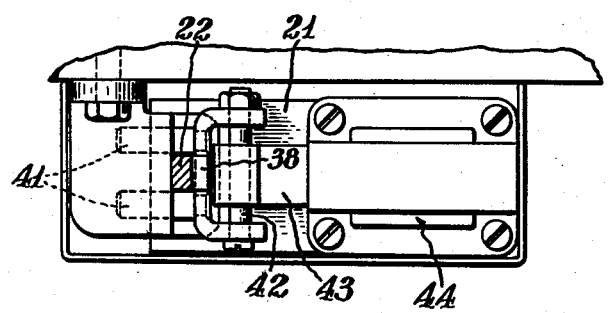
Fig. 3 is a section taken substantially on the line 3—3 of Fig. 2.

In the preferred form of the invention illustrated in detail in Figs. 2 and 3, the first of these objects is accomplished by establishing a trip connection between the draw bars 17 and 18 whereby they are disconnected at the bottom of their stroke and the draw bar 17 permitted to rise to its normal or idle position even though the treadle 19 is maintained depressed; and the second of these objects is accomplished by means of an electrical latching mechanism which normally prevents actuation of the draw bar 17 and is released only by the combined action of two manually operated push buttons.

As shown in Fig. 2, a frame or casing 21 is mounted rigidly in any suitable manner on the side of the frame 1 of the press and carries a slide 22 connected in any suitable manner as illustrated at 23 to the lower end of the draw bar 17. The lower end of the slide 22 is provided with an offset shoulder 24 which normally engages a stop in the form of a pin 25 fixed in the casing 21 to determine the idle position of the slide 22 and consequently of the draw bar 17. A trip member 26 is pivoted as illustrated at 27 on the upper end of the draw bar 18 and is provided with a slot 28 adapted to receive a pin 29 fixed in the casing 21 and consequently serving as a guide for the upper end of the trip member. The lower portion of the trip member bears against a roller 31 mounted on a pin 32 fixed in the casing 21 and is yieldingly pressed against said roller by suitable means such as a spring-pressed plunger 33 slidably mounted in a recess 34 in the trip member and yieldingly urged against the side of the casing 21 by means of a spring 35. The upper end of the trip member 26 is provided with a shoulder 36 normally engaging the shoulder 24 on the slide 22 so as to connect the trip member and slide and consequently tractively connect the draw bars 17 and 18. Downward motion of the trip member 26, however, causes the roller 31 to engage an inclined portion 37 thereof, whereby the trip member is caused to tilt around the pin 29 in a clockwise direction, compressing the spring 35 until the shoulder 36 is moved out of engagement with the shoulder 24 of slide 22, whereupon the slide and draw bar 17 are free to return to idle position.

The electrical latching mechanism comprises an abutment 38 on slide 22, and a latch 39 adapted to engage said abutment, slidably mounted in the casing 21 as by means of guide pins 41 (Fig. 3) and pivotally connected as by means of a bolt 42 to a plunger 43 arranged to be actuated by an electromagnetic coil 44. The latch 39 is normally maintained in engagement with abutment 38 as illustrated in Fig. 2 by suitable means such as a spring 45.

Figure 4:
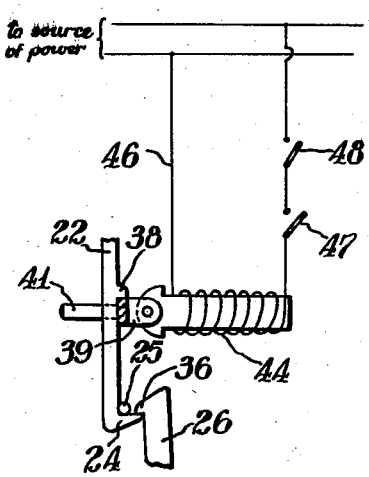
Fig. 4 is a semi-diagrammatic representation of the single-stroke trip mechanism and guard device including the electrical circuit therefor.

One end of coil 44 is connected to one terminal of any suitable source of power, not illustrated, as by means of a lead 46, while the other end of coil 44 is connected to the other terminal of said source of power through two normally open manually operable switches 47 and 48 (Figs. 4 and 1) which are connected in series whereby both said switches must be closed in order to energize the coil 44.

As shown in Fig. 1, switches 47 and 48 are preferably in the form of push buttons mounted on a panel 49 which may be pivotally mounted on the front of the table 11 and maintained in conveniently adjusted position by suitable means such as indicated at 51. The push buttons 47, 48 are spaced from the anvil 12 and from each other a sufficient distance to insure that it is necessary for the operator to actuate each push button with one hand, and when so doing, his hands are at a safe distance from the operating mechanism of the press.

In the operation of the device, the blank is placed in the press on the die 14 by the operator and then the operator places his hands on the push buttons 47, 48, depressing them to complete the circuit for the coil 44 whereby the latch 39 is withdrawn from engagement with the abutment 38 on slide 22. The operator then depresses pedal 19, whereupon the slide 22 is drawn down by the trip member 26, causing actuation of the clutch 16 to connect eccentric 9 to driver shaft 3. Continued downward motion of the trip member 26 causes it to disengage from the slide 22, whereupon the slide and draw bar 17 are free to return to their idle positions and the clutch 16 is released after the eccentric 9 has made one complete revolution.

It will be readily appreciated that if the operator fails to keep both hands on the push buttons, the latch 39 will not release and actuation of the press is effectively prevented. Furthermore, in any case, actuation of the press is restricted to one revolution for each operation of the treadle 19, and it cannot be re-operated until the treadle is released to permit the trip member 26 to reengage with the slide 22 by returning to its idle position as illustrated in Fig. 2.

Although but one form of the invention has been shown and described in detail, it will be understood that other embodiments are possible and various changes may be made in the design and arrangement of the parts without departing from the spirit of the invention as defined in the claims appended hereto.

What is claimed is:

1. In a punch press, in combination with a ram, operating mechanism for the ram and controlling means for the operating mechanism including a draw bar and slide, a manually operable trip member normally tractively engaging said slide, means whereby operation of the trip member to actuate the slide causes the trip to disengage from the slide by the final motion of the trip member, a latch maintaining the slide in idle position, an electromagnet for withdrawing said latch, and means for energizing said electromagnet including a pair of manually operable switches in series, located remote from the ram and from each other.

2. In a punch press, in combination with a ram, operating mechanism for the ram and controlling means for the operating mechanism including a draw bar and slide, a manually operable trip member normally tractively engaging said slide, means for tilting said trip as it approaches the end of its stroke to disengage it from the slide, means for reengaging the trip with the slide upon return of the trip to idle position, a latch normally preventing movement of the slide from idle position, an electromagnet for withdrawing said latch, and means for energizing said electromagnet including a pair of normally open manually operable switches in series located remote from the ram and from each other.

3. In a punch press, in combination with a ram, operating means therefor including a flywheel and a single stroke clutch mechanism for connecting the flywheel to actuate the ram, means for closing the clutch mechanism to cause actuation of the ram including a slide member, a trip member normally engaged therewith and a treadle operable by the foot of the operator for actuating said trip member, cam means operative on the trip member as it approaches the end of its stroke for disconnecting the trip member from the slide member at the end of their operative stroke, means for thereupon returning the slide member and its associated parts to normal position, means for reengaging the trip member with the slide member when the trip member is returned by the operator to normal position, a latch for maintaining the slide member in normal position, and means including a pair of manually operable members located remote from the ram and from each other, the concurrent operation of which causes the latch to be released to permit the initiation of a cycle of operation of the press by actuation of the treadle.

JAMES MacBLANE.